United States Patent [19]

Yokomichi et al.

[11] Patent Number: 4,675,492
[45] Date of Patent: Jun. 23, 1987

[54] NOZZLE ELEVATING DEVICE FOR A WIRE CUTTING ELECTRIC DISCHARGE MACHINE

[75] Inventors: Shigeharu Yokomichi, Isehara; Yasunori Ono, Hatano, both of Japan

[73] Assignee: Amada Company, Limited, Japan

[21] Appl. No.: 792,771

[22] Filed: Oct. 30, 1985

[30] Foreign Application Priority Data

Oct. 30, 1984 [JP] Japan .................... 59-226850

[51] Int. Cl.⁴ ............ B23H 7/02; F16F 7/12
[52] U.S. Cl. ............... 219/69 W; 219/69 R; 267/147
[58] Field of Search ........... 219/69 W, 69 R, 69 D, 219/69 E, 69 M, 69 S; 248/562, 636; 267/141, 153

[56] References Cited

U.S. PATENT DOCUMENTS

| | | | |
|---|---|---|---|
| 3,609,279 | 9/1971 | Giesbrecht | 219/69 G |
| 3,748,427 | 7/1973 | Baldwin | 219/69 E |
| 4,238,104 | 12/1980 | Hamilton | 248/636 |
| 4,439,659 | 3/1984 | Shimizu | 219/69 V |
| 4,468,016 | 8/1984 | Pineau | 267/141 |
| 4,481,095 | 11/1984 | Inoue | 219/69 V |
| 4,495,393 | 1/1985 | Janicke | 219/69 W |

FOREIGN PATENT DOCUMENTS

| | | | |
|---|---|---|---|
| 56-76338 | 6/1981 | Japan | 219/69 W |
| 56-76340 | 6/1981 | Japan | 219/69 W |
| 107827 | 6/1984 | Japan | 219/69 M |
| 963786 | 10/1982 | U.S.S.R. | 219/69 M |

Primary Examiner—A. D. Pellinen
Assistant Examiner—Geoffrey S. Evans
Attorney, Agent, or Firm—Wigman & Cohen

[57] ABSTRACT

A nozzle lifting apparatus for a wire cutting electric discharge machine consisting of a nozzle for supplying a processing liquid or dielectric fluid to the electric discharge section of a workpiece, the nozzle being provided on the lower section of an elevating rod vertically movably supported by an upper arm; a slide member provided vertically movably on the inside of a guide frame integrally provided on the elevating rod; and an elevating activation rod supported on the upper arm for vertically activating the elevating rod through the slide member and interlockingly linked to the slide member. A concave section formed in the guide frame of the nozzle lifting apparatus is provided with a shock absorbing member. The slide is also located in the concave section.

5 Claims, 4 Drawing Figures

NOZZLE ELEVATING DEVICE FOR A WIRE CUTTING ELECTRIC DISCHARGE MACHINE

BACKGROUND OF THE INVENTION

1. Field of the Invention

The present invention relates to a device for moving a nozzle on a wire cutting electric discharge machine in the vertical direction, and more particularly to a nozzle elevating device for a wire cuttng electric discharge machine wherein the nozzle can automatically adhere to the upper surface of the workpiece being processed, and when the nozzle is about to strike an obstacle while it is being lowered, the device will automatically stop the descent of the nozzle.

2. Description of the Related Art

Generally, a wire cutting electric discharge machine is provided with a worktable on which the workpiece being processed is removably supported, and which can be freely moved horizontally in the direction of the X and Y axes, and in addition, is provided with a wire electrode guide which guides a wire elctrode which travels in the vertical direction and perforates the workpiece. It is desirable that this wire electrode guide approach as close as possible to the surface of the workpiece so that, generally, a process liquid or dielectric fluid is introduced through a nozzle into the discharge section between the workpiece and the wire electrode.

In a wire cutting electric discharge machine, in order to carry out efficiently the removal of the scrap from the electric discharge position, and the cooling of the position of the electric discharge processing of the workpiece, and to prevent scattering of the process liquid, it is desirable that the nozzle adhere to the surface of the workpiece. Accordingly, conventionally, a manual operation is adopted to move the nozzle in the vertical direction, or a semi-automatic operation is adopted by driving a motor to effect vertical movement of the nozzle.

However, manual operation can be extremely troublesome. Also, in the case of operation by driving a motor, it is troublesome that the motor must be halted while watching the nozzle approaching the surface of the workpiece. In addition, there is extreme variation in the adherability of the workpiece and the nozzle. Occasionally, the nozzle presses too strongly against the surface of the workpiece.

SUMMARY OF THE INVENTION

A first object of the present invention is to provide a nozzle elevating device which can elevate the nozzle automatically, and in which a uniform contact pressure can always be maintained between the nozzle and the workpiece.

A second object of the present invention is to provide a nozzle elevating device in which, if the nozzle is about to strike an obstacle while descending, the descent can be automatically halted.

A third object of the present invention is to provide a nozzle elevating device which is able to follow the irregularities in the surface of the workpiece while performing the elevating action.

These objectives of the present invention are achieved by the provision of a wire cutting electric discharge machine wherein a nozzle, which supplies a process liquid or dielectric fluid to the electric discharge section of a workpiece, is provided on the lower section of an elevating rod which is supported with free vertical movement on an upper arm. A slide member is provided with free vertical movement on the inside of a guide frame integrally provided on the elevating rod, and an elevating activation lever for activating the elevating rod through the slide member is supported on the upper arm, and the elevating activation rod and the slide member are interlockingly linked. In addition, an overrun detection device which detects when the slide member has descended more than a prescribed amount in relation to the guide frame is provided on the guide frame, and a shock absorbing member is provided within the guide frame to absorb the shock when the slide member descends abnormally.

Other and further objects and advantages of the present invention will be apparent from the following description and companying drawings which, by way of illustration, show a preferred embodiment of the present invention and the principle thereof.

DESCRIPTION OF THE PREFERRED EMBODIMENTS

Figure 1:
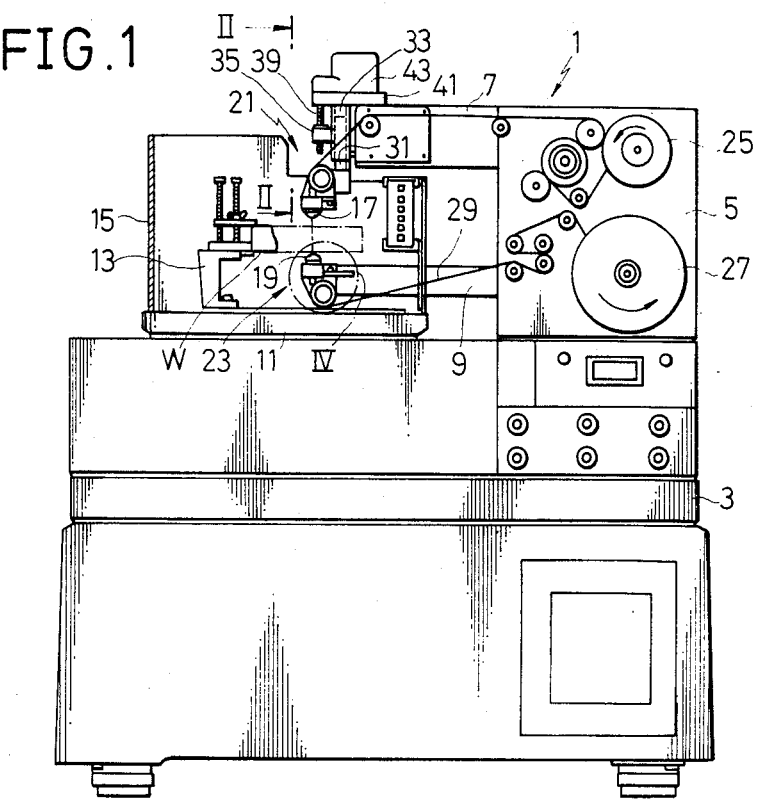
FIG. 1 is a front elevational view of an embodiment of the present invention.

Now referring to FIG. 1, in a wire cutting electric discharge machine 1, a column 5 stands perpendicularly on a base 3. An upper arm 7 and a lower arm 9 are provided horizontally and in vertical opposition on the upper section and lower section of the column 5. In addition, a worktable 11 which moves freely and horizontally in both the X axial direction and the Y axial direction is provided on the base 3. A workpiece support pedestal 13 which supports a workpiece W to be processed, is provided on the worktable 11. In addition, a cover 15 which surrounds the workpiece support pedestal 13 is also provided on the worktable 11.

The tip sections of the upper arm 7 and the lower arm 9 face the interior of the cover 15. A plurality of wire guide devices 21 and 23 are mounted on the tip sections of the upper arm 7 and the lower arm 9 and is provided with a plurality of nozzles 17 and 19. These nozzles 17 and 19 feed a processing liquid to the electric discharge section of the workpiece W. A slender wire electrode 29 which is continuously fed to a take-up reel 27 from a feed reel 25 mounted in a freely rotating manner on the column 5 is guided perpendicularly above and below the workpiece W by the wire guide devices 21 and 23. The wire cutting electric discharge machine 1 of this configuration performs the processing of the workpiece by the production of an electric discharge between the workpiece W and the perpendicular part of the wire electrode 29 which is guided by means of the upper and lower wire guide devices 21 and 23. The removal of the processing scrap from the processed sections of the workpiece W, and the cooling of the wire electrode and the processed section is carried out by the use of a processing liquid which is injected from the nozzles 17 and 19 provided on-the upper and lower wire guide devices 21 and 23.

The upper wire guide device 21 is provided with free vertical mobility so that when the workpiece W is processed, the mounting and removal of the workpiece W from the workpiece support pedestal 13 is easily accomplished, and the nozzle 17 can always adhere to the upper surface of the workpiece W conforming to the thickness of the workpiece W.

Figure 2:
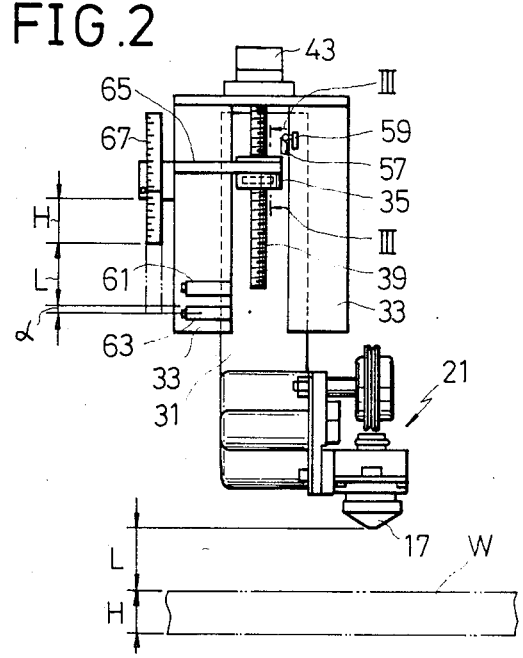
FIG. 2 is an enlarged view along the line II—II in FIG. 1.

In more detail, as shown in FIG. 2, the upper wire guide device 21 is provided on the lower section of the elevating rod 31. The elevating rod 31 is guided and supported in a freely movable manner in the vertical direction on a guide plate 33 provided on the tip of the arm 7. At a suitable position on the elevating rod 31, a guide frame 35 is integrally provided, and a nut member 37 is provided in a freely movable manner in the vertical direction between upper and lower limits in the guide frame 35, as shown in detail in FIG. 3. The nut member 37 acts as a slide member, freely sliding in the guide frame 35 in the vertical direction. This nut member 37 engages a threaded rod 39 which penetrates the guide frame 35 in the vertical direction. The threaded rod 39 acts as an elevating activation rod for vertically activating the elevating rod 31 through the nut member 37. The threaded rod 39 is interlockingly linked in a suitable manner to a control motor 43 which is supported on the upper arm 7 through a bracket 41. Accordingly, by the suitable driving rotation of the control motor 43, the upper wire guide device 21 can move vertically.

Figure 3:
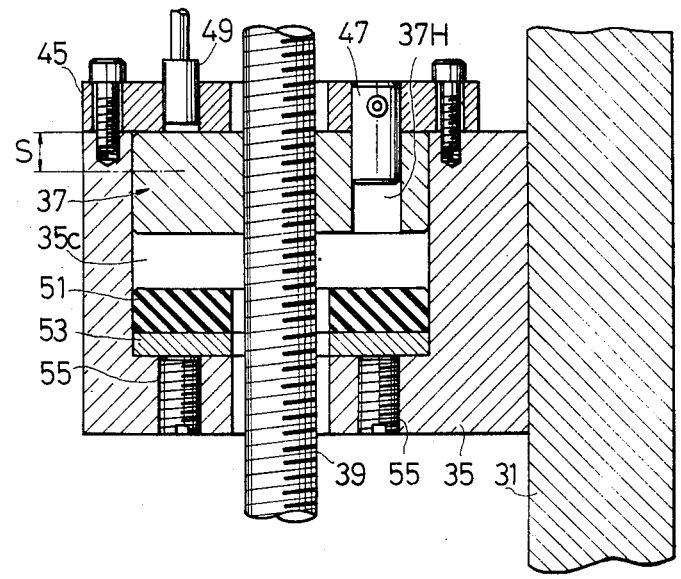
FIG. 3 is an enlarged sectional view taken along the line III—III in FIG. 2.

Furthermore, now referring to FIG. 3, the guide frame 35 has a box shape which forms a concave section 35C. The nut member 37 moves freely vertically internally within the concave section 35C. A stopper plates 45 which controls the upper limit of the nut member 37 is mounted on the upper section of the guide frame 35. A pin 47 which engages a hole 37H formed in the nut member 37 is integrally mounted on the stopper plate 45. In addition, an overrun detection device 49 is mounted on the stopper plate 45. The overrun detection device 49 which can be, for example, a magnetic sensor such as a proximity switch, has a configuration so that its detection action takes place when the nut member 37 is separated more than a designated distance S from the stopper plate 45.

A shock absorbing member 51 made of urethane rubber or a similar material is mounted in the concave section 35C of the guide frame 35 in order to absorb the shock when the nut member 37 descends abnormally against the guide frame 35. A support plate 53 is provided under the shock absorbing member 51. The support plate 53 is supported by a plurality of bolts 55 which are screwed into the bottom part of the concave section 35C of the guide plate 35.

Through the above configuration, by causing the threaded rod 39 to suitably rotate so that the nut section 37 is elevated, the elevating rod 31 and the upper wire guide device 21 are suitably elevated by the stopper plate 45 and the guide frame 35. Conversely, when the nut member 37 is lowered, the force of gravity causes the upper wire guide device 21 and the elevating rod 31 to follow the descent of the nut member. The upper wire guide device 21 descends, and when the upper nozzle 17 provided on the wire guide device 21 contacts the upper surface of the workpiece W, the descent of the wire guide device 21 and the elevating rod 31 is halted. Subsequently, the nut member 37, after several rotations of the threaded rod 39, slightly descends relative to the guide frame 35. When the nut member 37 reaches a position a certain distance spaced from the stopper plate 45, instructions to reduce speed and to halt are output to the control motor 43 by means of a detection apparatus which will be later described. Accordingly, the upper nozzle 17 provided on the upper wire guide device 21, contacts the upper surface of the workpiece W through the force of gravity.

In addition, the elevating rod 31 and the upper wire guide device 21 descend through the rotation of the threaded rod 39. After this descent is halted, the driving of the control motor 43 does not stop, and the overrun detection device 49 detects when the nut member 37 is separated from the stopper plate 45 by more than the designated distance S, and causes the control motor 43 to come to an emergency halt. In addition, when the nut member 37 descends abnormally and contacts the shock absorbing member 51, the shock is absorbed by the shock absorbing member 51. Specifically, safety is doubly ensured, and the upper nozzle 17 is prevented from pressing strongly against the workpiece.

When the control motor 43 is suitably driven and the elevating rod 31 moves vertically, as previously outlined, a dog 57 is installed at a suitable position on the elevating rod 31 to regulate the upper limit of the elevating rod 31. An upper limit detection switch 59, such as a limit switch activated by the dog 57, is installed on the guide plate 33. In addition, in order to control the speed of descent and stop position of the elevating rod 31, a first detection device 61 and a second detection device 63, which may be proximity switches, are installed vertically separated in the lower vicinity of the guide plate 33. The nut member 37 is provided with a support arm 65 which is extended horizontally and vertically movable. A scale 67 at a position freely adjustable in the vertical direction is removably supported on the tip of this support arm 65.

In this configuration, the distance from the position where the second detection device 63 detects the bottom end of the scale 67 to the indicator of the support arm 65 is previously set at (H +L +alpha) wherein H is the thickness of the workpiece W and L is the distance from the top surface of the workpiece W to the upper nozzle 17 (however, alpha <S). Then, the graduations of the scale 67 corresponding to the thickness H of the workpiece W are set in line with the indicator of the support arm 65. Then the control motor 43 is started, and the elevating rod 61 is lowered. The first detection device 31 detects the lower tip of the scale 67, and the speed of rotation of the control motor 43 is reduced, along with the speed of descent of the elevating rod 31 etc. Furthermore, when the elevation rod 31 etc. descends by the full distance (L), the upper nozzle 17 contacts the upper surface of the workpiece W, and the descent of the elevating rod 31 etc. is halted. However, the control motor 43 still does not halt, but continues to rotate at a very slow speed, and when the nut member 37 descends by a very small distance (alpha) with respect to the guide frame 35, the second detection device 63 detects the bottom end of the scale 67 and halts the control motor 43. Specifically, as previously described, the control motor 43 is halted with the nut member 37 and the stopper plate 45 slightly separated.

Figure 4:
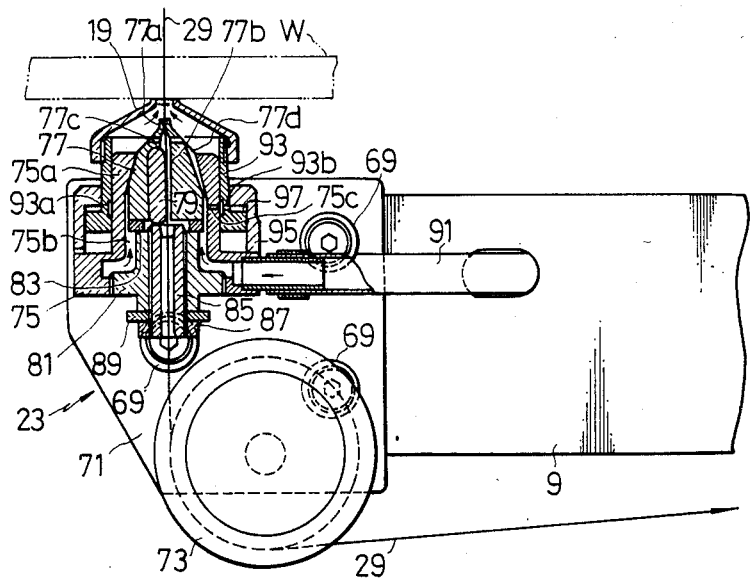
FIG. 4 is an enlarged front sectional view of the part marked IV in FIG. 1.

Now referring to FIG. 4, the lower wire guide device 23 is supported on the tip of the lower arm 9. In more detail, a bracket 71, which is removably secured at the tip of the lower arm 9 by means of a plurality of bolts 69, is electrically isolated from the lower arm 9 by an insulating body (omitted from the drawings). The wire guide device 23 is mounted on the bracket 71 along with a guide reel 73 which guides the wire electrode 29, mounted in a freely rotatable manner.

The wire guide device 23 comprises a support body 75 which is mounted on the bracket 71. A cylindrical section 75a, which protrudes in the upper direction, is formed on the upper part of the support body 75, and a suitably formed hollow section 75b is formed on the inside. A wire guide 77 which guides the wire electrode 29 penetrates into the hollow section 75b of the support body 75. The wire guide 77 is fittably secured in which an upper tip 77a protrudes from the cylindrical section 75a of the support body 75. The wire electrode 29 passes through a through hole 77b drilled in the vertical direction in the center section. A communicating hole 77c drilled in the upper tip 77a in the radial direction communicates with the through hole 77b. A current conducting body 79 which contacts the wire electrode 29 is mounted on the inner section of the wire guide 77. In addition, a plurality of grooves 77d are formed in the longitudinal direction of the peripheral surface of the wire guide 77 at a suitable number of locations.

In addition, a guide retainer 81 is screwed onto the support body 75. The guide retainer 81 fits into the support body 75 from the bottom direction. A cylinder 83 is positioned between the edge surface of the guide retainer 81 inside the hollow section 75b and the bottom surface of the wire guide 77. A pipe-shaped current conductor body retainer 85 is screwed into the center section of the guide retainer 81. The current conductor body retainer 85 retains the current conductor body 79 from the bottom direction. A terminal 89 which is connected to a power cable (not shown in the drawings) is mounted by means of a nut 87 on the lower edge which protrudes in the lower direction from the guide retainer 81. Accordingly, electric power is provided through the terminal 89, the current conductor body retainer 85, and the current conductor body 79 to the wire electrode 29.

Furthermore, a feed pipe 91 which supplies the processing liquid to the inside of the hollow section 75b is connected to the support body 75. In addition, a movable tubular body 93, which is freely movable in the vertical direction, engages the outer periphery of the cylindrical section 75a on the support body 75. This movable tubular body 93 surrounds the cylindrical section 75a and engages with a fixed tubular body 95 installed on the support body 75 to form one type of cylinder construction. A pressure chamber 97 is formed between the movable tubular body 93 and the fixed tubular body 95. A peripheral channel 93a of a suitable width is formed on the internal peripheral surface of the fixed tubular body 93. This peripheral channel 93a and the pressure vessel 97 communicate with each other through a communication hole 93b formed in the movable tubular body 93. In addition, the peripheral channel 93a communicates with the hollow section 75b through a communication hole 75c formed in the cylindrical section 75a of the support body 75. The nozzle 19, formed as a conical tube which inject a processing liquid in the direction of the processing section of the workpiece W, is screwed onto the upper section of the fixed tubular body 93.

In a configulation such as outlined above, when a process liquid is fed from the feed pipe 91 into the hollow section 75b of the support body 75, the process liquid passes through the grooves 77d formed in the peripheral surface of the wire guide 77, and reaches the inside of the nozzle 19. One part of this process liquid flows through the communication hole 77c in the wire guide 77, flows down through the through hole 77b, cools the current conducting body 79 and the current conducting body retainer 85 etc., and is exhausted in the downward direction. The processing liquid which flows into the nozzle 19 causes the nozzle 19 to elevate because of the internal pressure, and the tip of the nozzle 19 is made to contact the lower surface of the workpiece W. Then, the process liquid is injected onto the electric discharge processing section from the tip of the nozzle 19. Accordingly, only a small amount of processing liquid is scattered from between the tip of the nozzle and the workpiece W. The feed of the process liquid to the electric discharge processing section is adequately carried out, and the efficiency of the removal of the process scrap from the electric discharge processing section can be improved.

In addition, one part of the process liquid which is fed from the feed pipe 91 to the hollow section 75b of the support body 75 flows from the communication hole 75c provided in the cylindrical section 75a of the support body 75 through the peripheral channel 93a and the communication hole 93b of the movable tubular body 93 to the pressure chamber 97. The pressure in the pressure chamber 97 activates the piston part of the movable tubular body 93 so that the movable tubular body 93 and the nozzle 19 are pressed down in the lower direction. Accordingly, by suitably designing the ratio of the force for elevating the nozzle 19 as a result of its internal pressure, to the force for causing the nozzle 19 to descend due to the pressure on the inside of the pressure chamber 97—in other words, by suitably designing the ratio between the pressurized surface area of the nozzle 19, and the pressurized surface area of the piston part of the movable tubular body 93 in the pressure chamber 97—the pressure at which the tip of the nozzle 19 contacts the workpiece W can be made small (light). Accordingly, the problems from the tip of the nozzle 19 contacting the workpiece W at a high pressure—for example, when the reactive force from the contact pressure produces minute deflections in the lower arm 9, and the processing precision is reduced, or when the abrasion between the nozzle 19 and the workpiece W becomes so large that the positioning movement of the workpiece W deteriorates—are eliminated.

By means of the above configuration, it is possible to feed large volumes of processing liquid to the electric discharge processing section of the workpiece, and it is possible to carry out efficient removal of the process scrap from the processing section. In addition, there are no problems arising from excessive contact pressure of the tip of the nozzle against the workpiece.

Further, because the structure of the upper wire guide device 21, as outlined above, is substantially identical to that of the lower wire guide device 23, the details of the lower wire guide device have been omitted.

As can be clearly understood from the above explanation of the embodiment of the present invention, by means of this invention it is possible for the nozzle to closely contact the workpiece in a freely movable manner, and it is possible to always maintain a uniform contact pressure relative to the workpiece without this pressure becoming larger than necessary, and the capability of the nozzle to follow the irregularities on the surface of the workpiece is improved.

Although only preferred embodiments are specifically illustrated and described herein, it will be appreciated that many modifications and variations of the present invention are possible in light of the above teachings and within the purview of the appended claims without departing from the spirit and intended scope of the invention.

What we claimed is:

1. A nozzle lifting apparatus for a wire cutting electric discharge machine comprising:
   a nozzle for supplying a processing liquid or dielectric fluid to the electric discharge section of a workpiece, said nozzle being provided on the lower section of an elevating rod vertically movably supported by an upper arm;
   a guide frame integrally provided on said elevating rod, said guide frame forming a concave section;
   a slide member provided vertically movable on the inside of said concave section of said guide frame;
   an elevating activation rod supported on the upper arm for vertically activating the elevating rod through the slide member and interlockingly linked to the slide member;
   an overrun detection device mounted on the guide frame cooperable with the slide member provided on the inside of the concave section; and
   a shock absorbing member provided within said concave section of the guide frame and cooperable with said slide member provided on the inside of said concave section to absorb the shock during abnormal descent of the slide member.

2. The nozzle lifting apparatus of claim 1, wherein the elevating activation rod is linked to a control motor which is supported on the upper arm.

3. The nozzle lifting apparatus of claim 2, wherein the elevating acitvation rod is a threaded rod.

4. The nozzle lifting apparatus of claim 1, wherein the overrun detection device is a magnetic sensor.

5. The nozzle lifting apparatus of claim 1, further comprising an upper limit detection switch, with an activation means, mounted on a guide plate provided at the tip of the upper arm.

* * * * *